United States Patent [19]
Goto

[11] 3,829,694
[45] Aug. 13, 1974

[54] AN APPARATUS FOR DETECTING GASES OR CORPUSCLES BY LIGHT ABSORPTION AND SCATTERING

[75] Inventor: Kenya Goto, Yokohama, Japan

[73] Assignee: Tokyo Shibaura Electric Co., Ltd., Kawasaki-shi, Japan

[22] Filed: Mar. 30, 1973

[21] Appl. No.: 346,451

[30] Foreign Application Priority Data
Mar. 31, 1972 Japan.............................. 47-32189

[52] U.S. Cl................. 250/339, 250/341, 250/432, 356/51, 356/75
[51] Int. Cl......................... G03b 27/62, G01t 1/00
[58] Field of Search ......................... 250/339–353, 250/226, 432; 356/51, 75

[56] References Cited
UNITED STATES PATENTS

| | | | |
|---|---|---|---|
| 2,404,064 | 7/1946 | Heigl et al. ......................... | 250/339 |
| 3,056,958 | 10/1962 | Anderson............................ | 250/340 |
| 3,089,382 | 5/1963 | Hecht et al. ........................ | 250/226 |
| 3,174,045 | 3/1965 | Whitney et al. ..................... | 250/226 |
| 3,405,268 | 10/1968 | Brunton ............................. | 250/339 |
| 3,517,190 | 6/1970 | Astheimer.......................... | 250/341 |
| 3,678,269 | 7/1972 | Malek................................ | 250/341 |

Primary Examiner—Harold A. Dixon
Attorney, Agent, or Firm—Oblon, Fisher, Spivak, McClelland & Maier

[57] ABSTRACT

Apparatus for detecting gases or corpuscles is provided with means for transmitting pulse light which is to be absorbed resonantly by gases or corpuscles; means for obtaining an output signal according to the amount of Mie scattering beams of said transmitting pulse light from said gases or corpuscles; and means for detecting from said output signal the amount of resonance absorption involved during a predetermined time period after the transmission of said pulse light.

1 Claim, 4 Drawing Figures

AN APPARATUS FOR DETECTING GASES OR CORPUSCLES BY LIGHT ABSORPTION AND SCATTERING

This invention relates to an apparatus for detecting the kind and concentration of gases or corpuscles, for example, contaminating materials which are present in the atmosphere.

The following systems of detecting air pollutants using a laser radar are known.

A first system is set forth in "Nature" Vol. 224, P 170, 1967 or "Applied Physics Letters" Vol. 17, P 139, 1970. This system utilizes a Raman scattering. That is, a laser beam is radiated into the atmosphere and the radiated light is interacted with contaminating materials present in the atmosphere to produce Raman-shifted scattering beams inherent to the contaminating material. By analyzing an output of a photoelectric convertor obtained by receiving the scattering beam it is possible to detect the kind and concentration of said contaminating materials, and the position for which the contaminating materials are present. However, the Raman scattering cross-section of the molecules of the contaminating materials is small, and it is therefore impossible to detect in this remote measurement system the kind or the concentration distribution of contaminating materials.

Also known is a system for detecting the atmospheric contamination by a laser radar utilizing a resonance effect. This system is disclosed, for example, in DENT-SU-DANWAKAI-KIROKU (Tele-communication Symposium Records) published by TOHOKU University (Japan), Vol. 40, P 30, 1970 and in 'Data 9E-70-26' of "Quantum Electronics Society Data" published by "Electronics and Communication Society (Japan)." This system is subdivided into a resonance Raman scattering system and a resonance scattering system of spontaneous emission. The former system utilizes a phenomenon that the intensity of a Raman scattering is increased through resonance between a laser beam and an abosorption transition of the molecules and atoms of contaminating materials, and the latter utilizes a phenomenon that the intensity of spontaneous emission (fluorescence) is increased through resonance between a laser beam and an absorption transition of the molecules and atoms of contaminating materials. In both cases the laser of which oscillation wave length is tunable is required. These systems are characterized in that the detection sensitivity of specific contaminating molecules is good and that, since a reception light is different in wavelength from a transmitting light, it is possible to separate a Mie scattering and Rayleigh scattering. In the resonance scattering system for spontaneous emission, however, most of scattering beams once emitted are quenched through collision of the Raman scattering beams with the molecules and atoms of contaminating materials with the result that the life of the scattering beams is shortened to the order of $10^{-9} - 10^{-10}$ second with the attendant disadvantage. It is therefore difficult to separate the resonance Raman scattering beams and the quenched fluorescence scattering beams. With such laser radar utilizing the resonance effect, various effects are overlappingly produced and it is therefore very difficult to detect the absolute value of contaminating concentration.

A system for detecting the state of contamination by an apparatus utilizing a laser resonance absorption is known. This system is either by a long-path absorption spectroscopy or by a correlation spectroscopy. In the former, a laser light transmitter is positioned on one side of a predetermined long optical path and a receiver is located on the other side thereof. Through analysis of spectral absorption by contaminating materials present in the optical path, the concentration of the contaminating material is detected with high accuracy. In this case, the average concentration of the contaminating material present in the optical path can be worked out by the intensity of absorption, by a specific contaminating material, of a laser light having a wavelength resonating to a light absorption line of the specific contaminating material to be detected. The correction of concentration can be made using a laser light having a non-resonance wavelength for correction. However, it presents no distance resolution and only the average concentration of the contaminating material present in a spacial distance between the transmitter and the receiver can be obtained with the resultant disadvantage.

Accordingly, an object of this invention is to provide an apparatus capable of detecting the kind and concentration of gases or corpuscles by detecting the amount of absorption of the gases or corpuscles utilizing Mie scattering beams from the gases or corpuscles.

SUMMARY OF THE INVENTION

An apparatus of this invention includes means for transmitting pulse light which is to be absorbed resonantly by gases or corpuscles, means for obtaining an output signal according to the amount of Mie scattering beams of said transmitting pulse light from the gases or corpuscles; and means for detecting from the output signal the amount of resonance absorption involved during a predetermined time period after the transmission of the pulse light.

In one aspect of this invention, means is provided for varying the wavelength of said transmitting light and it is possible to provide an apparatus for detecting the absorption involved at the respective wavelengths.

In another aspect of this invention it is possible to provide an apparatus for detecting said absorption by sequentially shifting said predetermined time period.

In further aspect of this invention, means is provided for scanning a transmitting pulse light and it is possible to provide an apparatus for detecting said absorption of gases or corpuscles present in a plane or three-dimensional space by scanning a transmitting pulse light.

In still further aspect of this invention it is possible to provide an apparatus for detecting the absorption up to a relatively far distance for which gases or corpuscles are present.

In still further aspect of this invention it is possible to provide an apparatus capable of detecting gases or corpuscles which are present in large or small area.

This invention is characterized by detecting the absorption of said gases or corpuscles utilizing Mie scattering beams among reflected beams from the gases or corpuscles. The Mie scattering beams are intended to mean the scattering beams from gas molecules or corpuscles which are greater in diameter than the wavelength of said transmitting light.

DESCRIPTION OF THE PREFERRED EMBODIMENTS

Figure 1:
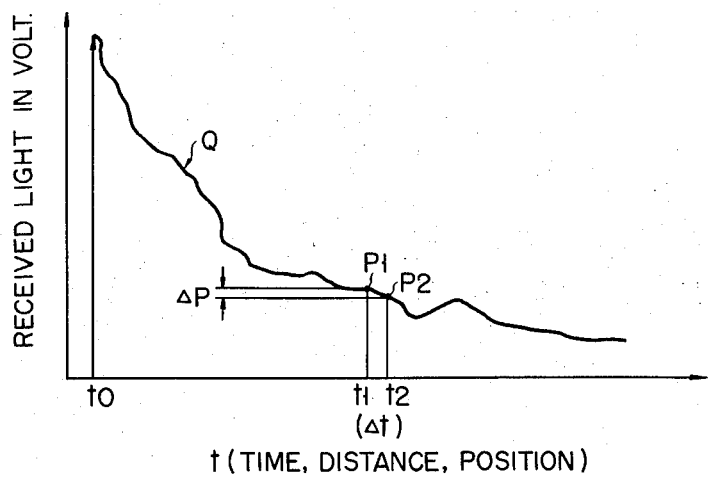
FIG. 1 is a characteristic curve showing the time-sequential variation of light reception voltages corresponding to Mie scattering beams obtained when a pulse laser beam is transmitted in the atmosphere; in which there is shown a difference valve between any two light reception voltages sampled from this curve.

When a pulse light, for example a pulse laser, varied in the intensity of absorption according to the kind and concentration of gases or corpuscles is transmitted in the form of a light pulse into the atmosphere, a time-sequent variation, as shown by a curve Q in FIG. 1, of Mie scattering beams from gases or corpuscles present in an optical path of the laser pulse beam is obtained. In FIG. 1 the time-sequent variation is represented with a light reception voltage V obtained by receiving the Mie scattering from the gases or corpuscles passed by the transmitting light and photoelectrically converting it. In the Figure, the time $t$ is plotted as abscissa and the light reception voltage V is plotted as ordinate. The light reception voltage V denotes an amount of the Mie scattering beam received; and the time $t_0$ plotted on the abscissa denotes the time at which a laser pulse light is transmitted. The time elapsed after the transmission of the laser pulse light corresponds to a distance from the source of the transmitting light as well as to a spacial position. Any point of the curve Q shown in FIG. 1 bears a relation to the amount of the Mie scattering beams in any spacial position, for example to the concentration of gases or corpuscles at the spacial position. Therefore, the concentration of the gases or corpuscles in any spacial position can be detected by measuring the average amount of Mie scattering beams received during the time period $\Delta t$ which is a time period $(t_2-t_1)$ representative of a difference between a time $t_1$ and a time $t_2$, $t_1$ and $t_2$ denoting a time elapsed after the transmission of the laser pulse light respectively. According to experiments conducted, the time period $\Delta t$ is about 1 $\mu s$ when the distance is 150m. When the distance is 15m, the time period is about 0.1 $\mu s$.

Figure 2:
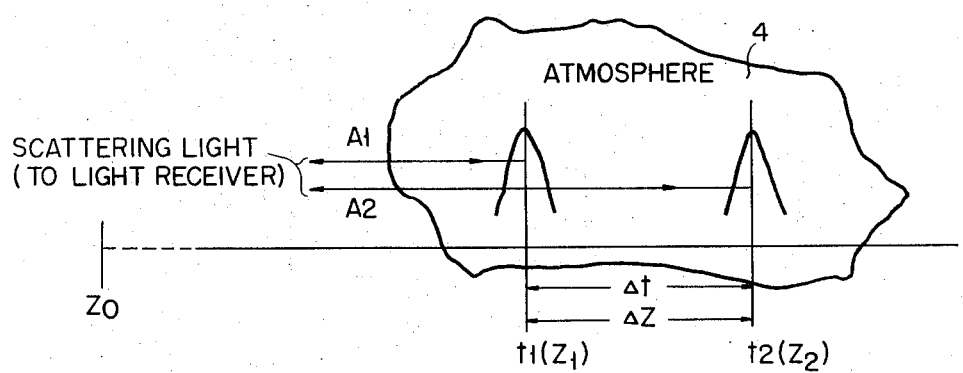
FIG. 2 is a view showing sampling positions and a spacial distance in the atmosphere both of which are related to sampling times shown on the characteristic curve of FIG. 1.

For example, a first sampling pulse is derived at a time $t_1$ from a first sampling unit and a second sampling pulse is derived at a time $t_2$ from a second sampling unit, as will be later described; and an output $P_1$ corresponding to the time $t_1$ and an output $P_2$ corresponding to the time $t_2$ are respectively taken out from the curve $Q_1$ in FIG. 1 utilizing these sampling pulses. In FIG. 2 are shown positions $Z_1$ and $Z_2$ in which Mie scattering beams corresponding to the light reception voltages $P_1$ and $P_2$ are emitted through pulse laser beams $A_1$ and $A_2$ transmitted into the atmosphere 4. As will be understood from this Figure a spacial distance between the positions $Z_1$ and $Z_2$ is $\Delta E$; and a time period $\Delta t$ representative of a time difference between the first and second sampling pulses corresponds to the spacial distance $\Delta Z$. In FIG. 2 $Z_0$ indicates the position at which the pulse laser beam is transmitted. The absorption of the transmitting pulse laser beam at the distance $\Delta Z$ between $Z_1$ and $Z_2$ can be detected by measuring $\Delta P$ indicative of a difference value between the light reception voltage $P_1$ at the time $t_1$ and the light reception voltage $P_2$ at the time $t_2$.

Since the pulse laser beams $A_1$ and $A_2$ travel back and forth along the same optical path at the same time, the light reception voltages $P_1$ and $P_2$ sampled by said two sampling pulses are substantially free from any influence except for influence from materials (gases or corpuscles) present in the optical path $\Delta Z$. It is because that any influence given to the $\Delta P$ by the material present on the optical path $(Z_0-Z_1)$ is negligible. By analyzing the value of the $\Delta P$ it is possible to determine the components of the materials present on the optical path $\Delta Z$ as well as scattering and absorption occurring on the optical path $\Delta Z$. Even if the scattering and absorption are mingled on the optical path, it will be evident that it is possible to determine an influence given to the transmitted pulse laser beam in the optical path by continuously varying the wavelength of the pulse laser beam. It is because that the light reception voltage $P_1$ represents a value obtained after the light beam travels its optical length 2 $(Z_0-Z_1)$ back and forth) and the light reception voltage $P_2$ represents a value obtained after the light pulse further travels its optical length $2\Delta Z$ (back and forth). The Mie scattering beams reflected from the gas or corpuscles in the optical path $2\Delta Z$ (back and forth) are received at a pulse laser beam receiving section as will be later described and photoelectrically converted, thereby obtaining the curve Q as shown in FIG. 1. Then, the difference $\Delta P$ between the light reception voltages $P_1$ and $P_2$ is obtained.

According to this invention, a sampling pulse generator to be later described is adjusted to permit the time period $\Delta t$ shown in FIGS. 1 and 2 to be set as a longer period from the outset, and detection is made over a wider range of the area to be detected. In a case where a minute area is required to be determined from consideration of the above detected value, detection can be made over a narrower range by setting the time period $\Delta t$ as a shorter period. A circuit for permitting the time period $\Delta t$ to be varied is conventionally known and any further explanation is therefore omitted.

According to this invention, the absorption of gases or corpuscles present in the horizontal plane, vertical plane or three-dimensional space of the area to be determined can be determined by scanning the transmitting pulse laser beam in a horizontal and/or vertical direction.

The difference $\Delta P$ between the light reception voltages $P_1$ and $P_2$ is primarily attributable to a voltage value developed by the Mie scattering beams incident into a light receiver, and it indicates a value representative of the absorption of the gases or corpuscles present in the space 4.

When at the transmission of the pulse light the time period $\Delta t$ is shifted, along the abscissa, from the time $t_0$ with the time period $\Delta t$ kept constant and thus the reception time is sequentially varied, then it is possible to determine the amount of absorption at any distance.

As set out above, the time period $\Delta t$ appearing in FIG. 1 corresponds to the distance for which the absorption is determined. When the time period $\Delta t$ is set as a longer period, an average detection value in a corresponding longer spacial distance can be obtained. When the time period $\Delta t$ is set as a shorter period, it is possible to obtain an average detection value in a corresponding shorter spacial distance. In other words, it is possible to detect the absorption of gases or corpuscles present in a very narrow spacial area.

There will now be explained means for electrically taking out a difference value $\Delta P$ between the voltages $P_1$ and $P_2$. The curve Q shown in FIG. 1 can be obtained by transmitting a single laser pulse beam. To facilitate explanation of a principle for taking out the difference value $\Delta P$, there is shown in FIG. 2 the case in which two laser pulse lights $A_1$ and $A_2$ instead of a single laser pulse light are assumed to be transmitted. Let, be $P_1$, a light reception voltage corresponding to the amount of Mie scattering beams from a spacial position $Z_1$ corresponding to a time $t_1$ on the pulse light $A_1$; and let, be $P_2$, a light reception voltage corresponding to the amount of the Mie scattering light from a spacial position corresponding to a time $t_2$ on the pulse light $A_2$. Then, $P_1 - P_2 = \Delta P$ corresponds, as mentioned above, to absorption of gases or corpuscles caused when the light travels a spacial distance $\Delta Z$, that is, the light travels back and forth along the optical path. In other words, $\Delta P$ can be expressed by a function of the distance $\Delta Z$, the concentration $\alpha$ of contaminating materials in the atmosphere and the wavelength $\lambda$ of the transmitting light. When a radar laser is used, $\Delta P$ can be expressed by a function of a horizontal scanned angle X, a vertical scanned angle Y and the corresponding detection time T. For convenience of explanation, a laser radar is assumed to be fixed at a certain elevation angle and at a certain horizontal angle, and the kind and concentration of the materials in the atmosphere are assumed to be not varied during the very short time period. Then, the difference value $\Delta P$ between the light reception voltages $P_1$ and $P_2$ will be expressed as follows:

$$\Delta P = f(Z_1, \alpha, \lambda, \Delta Z)$$
$$= f(ct/2, \alpha, \lambda, [ct/2]\Delta t) \text{ TM} \quad (1)$$

in which c denotes the velocity of light.

In the equation (1), when the time $t$ and the time period $\Delta t$ are made constant (For example, the pulse light is transmitted in the form of a reproducible high-repetitive pulse, not in the form of a double pulse light, and the light reception voltage is continuously observed at the reception section. Since the observation time $t_1$ can be fixed by a sampling technique $\Delta P$ can be converted into a DC voltage), then $\Delta P$ will be given as follows:

$$\Delta P = f(= \lambda) = \text{DC voltage} \quad (2)$$

in which $\alpha$ stands for the concentration of contamination in the spacial distance $\Delta Z$. From the concentration $\alpha$ a scattering cross section can be worked out. As will be evident from the equation (2) the DC voltage $\Delta P$ is varied by varying the wavelength of the transmitting laser light. $\Delta P$ is considered to be varied by three terms, that is, a term $\alpha_s$ linearly varied (though slightly) in scattering in the spacial distance $\Delta Z$ by wavelength (the shorter the wavelength, the larger the cross-section); a term $\alpha_{rs}$ varied by the resonance scattering; and a term $\alpha_a$ varied through absorption of the contaminating materials present in the spacial distance $\Delta Z$. Thus, $\Delta P$ can be expressed as follows:

$$\Delta P = f(\alpha_s \cdot \alpha_{rs} \cdot \alpha_a) \quad (3)$$

Figure 3:
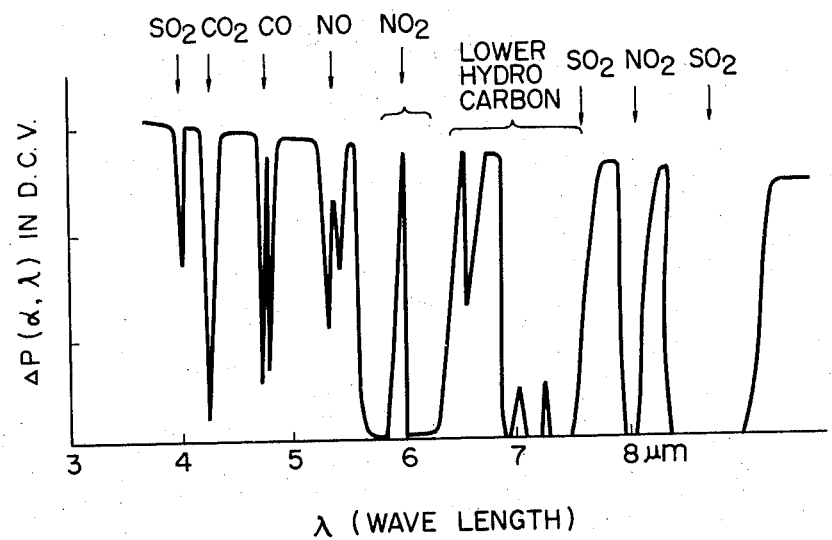
FIG. 3 is a view showing a relation between the difference value between the light reception voltages, the wavelength of the transmitting light and absorption characteristics of each gas.

In the equation (3), when selection is made of a transmitting light having a range of such wavelength as not to cause any resonance scattering by the contaminating material, then the term $\alpha_{rs}$ can be disregarded. That is, any influence from the term $\alpha_{rs}$ can cease to exist by transmitting a pulse light having a range of such wavelength as not to cause any resonance scattering by gases or corpuscles. As such wavelength range, for example, a coherent infrared light is most suitable. With respect to the term $\alpha_s$ wavelength dependability can be computed beforehand. Unless the wavelength is caused to be varied over a wider range so that a scattering coefficient is greatly varied by the wavelength, any influence given to the term $\alpha_s$ can be disregarded. Under the aforementioned conditions, when the wavelength $\lambda$ is plotted as abscissa and $\Delta P$ (DC voltage), a difference value between the light reception voltages $P_1$ and $P_2$, is plotted as ordinate, then a spectral absorption characteristic curve as shown in FIG. 3 can be described by an X-Y recorder. In FIG. 3, $\Delta P (\alpha, \lambda)$ is intended to mean that $\Delta P$ is varied by, for example, the concentration $\alpha$ of contaminating gases and the wavelength $\lambda$ of the transmitting light. Almost all gases or corpuscles cause absorption when the wavelength is within 3–20 $\mu$. From the curve as shown in FIG. 3 the kind and concentration of concentrating materials can be worked out. By analyzing such spectral absorption characteristic curve a content of, for example, 0.01ppm of $SO_2$, 2,000 ppm of CO and 0.03 ppm of NO can be analitically obtained. In this case, since the amount of a gaseous $N_2$ in the atmosphere is considered to be substantially constant, correction of an absolute concentraton can be effected utilizing the gaseous $N_2$ in the atmosphere. In a case where the absorption line of the gaseous $N_2$ is not present in gases or corpuscles to be detected a known value — for example, a concentration correcting gas cell, has only to be provided so that an absolute concentration of gases in the atmosphere can be detected.

As set out above, when the wavelength of the transmitting laser beam is caused to be varied, gases or corpuscles in the atmosphere exhibit, during the time period $\Delta t$, absorption corresponding to the respective wavelength, and the difference value $\Delta P$ between the light reception voltages $P_1$ and $P_2$ as shown in FIG. 3 can be detected by receiving the Mie scattering beams from the gases or corpuscles.

When the actual determination is made, scanning may effected first with the wavelength of a transmitting light kept constant and then by a transmitting light having a different wavelength. Or detection may be made first by fixing the radiation direction of a transmitting light in one direction and changing the wavelength of the light, and then by fixing the radiation direction thereof in the other direction and changing the wavelength of the light.

Figure 4:
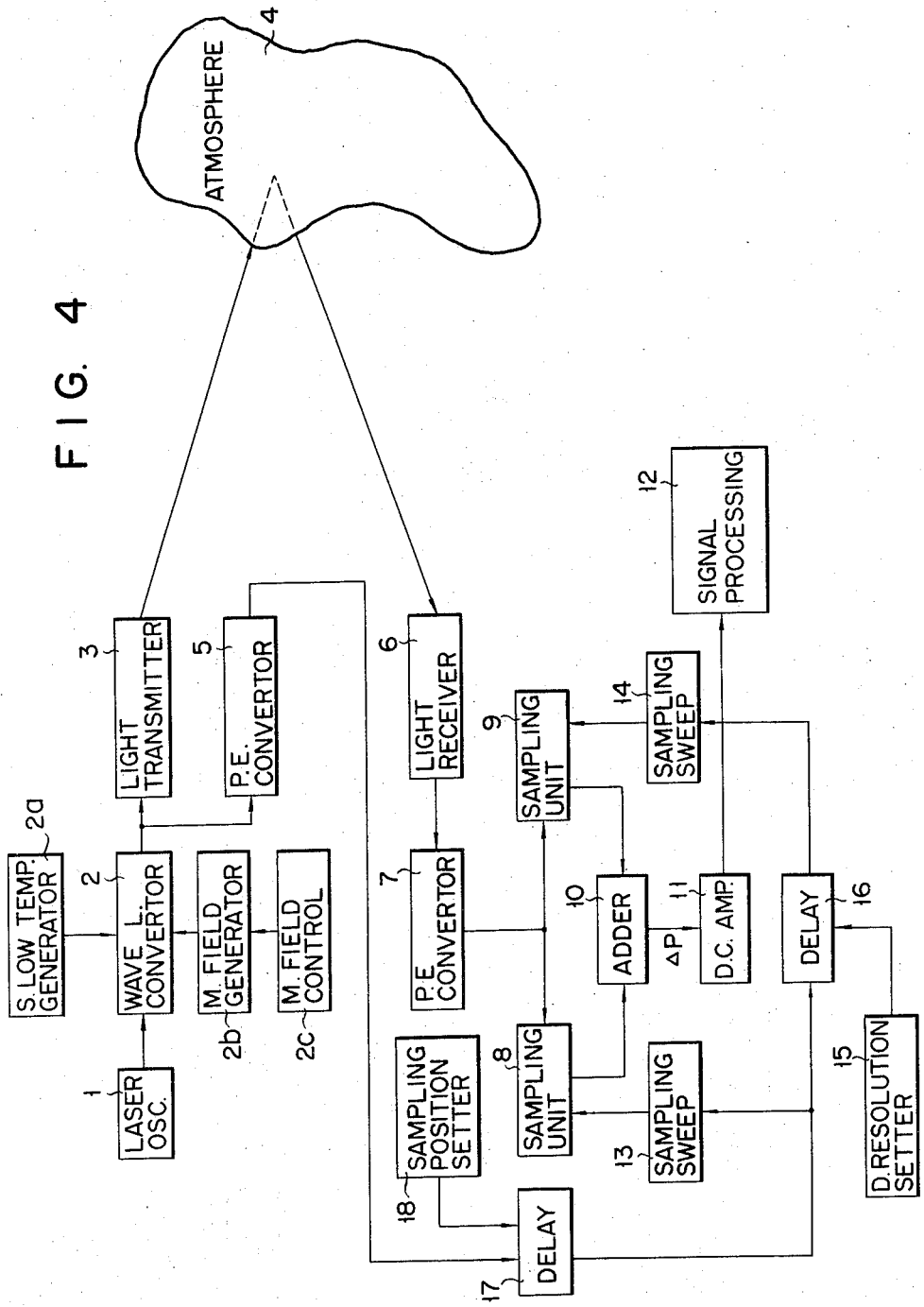
FIG. 4 is a block diagram showing one embodiment of this invention as applied for detection of air pollution or contamination.

FIG. 4 is a block diagram showing one embodiment of this invention as used in detecting a contamination distribution in the atmosphere. In FIG. 1 is a laser oscillator for producing a light beam, for example, a laser beam having length in infrared region, to be absorbed by gases or corpuscles present in the atmosphere. This laser is, for example, a $CO_2$ gas laser which produces a repetitive pulse light of 100 p.p.s. In the optical path of the laser oscillator 1 is provided a laser wavelength convertor 2 capable of varying the wavelength of the laser light. The laser wavelength converter 2 is, for example, a Spin-Flip Raman Laser (hereinafter referred to as SFR laser). A laser beam from the convertor 2 is transmitted, in the form of a laser pulse light, through a laser pulse light transmitter 3 into the air or atmosphere. The transmitter 3 includes means for radiating a laser light beam in a predetermined direction and means for scanning the laser beam in a horizontal and/or vertical direction. A photoelectric convertor 5 is provided for detecting a transmitting time $t_0$ (FIG. 1) each time a transmitting pulse light is transmitted from the transmitter 3. There is provided a light receiver 6 capable of receiving Mie scattering beams among reflection lights to be emitted when a transmitting laser pulse light collides with the gases or corpuscles present in the atmosphere 4. Furthermore, a photoelectric convertor 7 is provided for photoelectrically converting the Mie scattering beams received at the light receiver 6. As a photoelectric convertor, for example, a photomultiplier tube can be used. When the output signals of the photoelectric convertor 7 are time-sequentially observed using, for example, an oscilloscope, then a wave form as shown in the curve Q in FIG. 1 is obtained.

There will now be explained upon reference to the curve Q in FIG. 1 a device for detecting $\Delta P$, a difference value between the light reception voltage, from outputs $P_1$ and $P_2$ corresponding to times $t_1$ and $t_2$, respectively, using two sampling pulses. The output terminal of the photoelectric convertor 7 is connected to the input terminal of a first sampling unit 8 and of a second sampling unit 9. The output terminal of the respective sampling units is connected to an adder 10 for detecting a difference value, $\Delta P$, between those outputs of the photoelectric convertor 7 which correspond to the sampling times $t_1$ and $t_2$. The output terminal of the adder 10 is connected to a DC amplifier 11 and the output terminal of the DC amplifier is connected to a signal processing section 12. The signal processing section includes means for recording on a recording paper, or displaying on an oscilloscope, the characteristic curve as shown in FIG. 3 using the signal from the DC amplifier. To the other input terminal of the first and second sampling units 8 and 9 is connected the output terminal of first and second sampling sweeps 13 and 14. A pulse delay circuit 16 is provided in which delay time is controlled by a distance resolution setter 15. A trigger pulse delayed at this delay circuit is supplied to the second sampling sweep 14.

Connected to the output terminal of the photoelectric convertor 5 is a first pulse delay circuit 17 for generating a trigger signal representative of the transmitting time from $t_0$ (FIG. 1) of a transmitting laser light. Trigger pulses from this circuit are fed to the first sampling sweep 13 and the second pulse delay circuit 16. In the pulse delay circuits 16 and 17 a center-tapped delay line may be provided. As these circuits use may be made of a charge coupled device (CCD) and Bucket Drigade device (BDD). A strobing voltmeter may be used in place of the sampling units 8 and 9 and sampling sweeps 13 and 14.

Explanation is now made of the operation of a device as shown in FIG. 4. A repetitive laser pulse light of the order of, for example, 100 pps is oscillated from the laser oscillator 1. The wavelength of the laser pulse light is converted into a predetermined wavelength by the wavelength convertor 2 and then the wavelength-converted pulse light is transmitted from a laser pulse transmitter 3 into the atmosphere 4. The transmitted laser pulse light is reflected on those contaminating materials in the air or atmosphere present in the laser optical path. Among the reflected beams, Mie scattering beams, in particular, are reflected from gases or corpuscles in any instant position and sequentially returned to the laser beam receiver 6. The returned laser beams are sequentially converted, at the photoelectric convertor 7, into electrical signals. The waveform of the electrical signal will be, for example, as shown in FIG. 1. Sampling of light reception voltages $P_1$ and $P_2$ corresponding to the beginning and end of a desired time period, for example the beginning $t_1$ and end $t_2$ of $\Delta t$, is carried out at the sampling units 8 and 9 using this signal waveform Q. The sampling times of the respective sampling units are controlled by the first and second sampling sweeps 13 and 14. That is, the first sampling sweep 13, upon receipt of a trigger pulse from the pulse delay circuit 17 (for example $t_1$), feeds a first sampling pulse to the first sampling unit 8, and the trigger signal from the pulse delay circuit 17 is further delayed, for example a time period $\Delta t$ at the second pulse delay circuit 16. The delayed trigger signal is supplied at the time $t_2$ to the second sampling sweep 14. The sampling pulse from the second sampling sweep 14 is supplied at the time $t_2$ to the second sampling unit 9. The first sampling unit 8 samples a light reception voltage $P_1$, at the time $t_1$ at which the sampling pulse is supplied, from the output (curve Q) of the photoelectric convertor 5 and holds it. On the other hand, the second sampling unit 9 samples a light reception voltage $P_2$ at the time $t_2$ and holds it. The pulse delay circuit 17 delays the output of the photoelectric convertor 5 until the time $t_1$ (FIG. 1) from the time $t_0$. This amount of delay is controlled at a sampling space position setter 18. Thus, the control of a delay time at the circuit 17 permits a detection position in the space to be varied. The pulse delay circuit 16 delays an input trigger pulse a time period $\Delta t$ (FIG. 1), and the length of the time period $\Delta t$ (desired time period) is controlled by the distance resolution setter 15. Since the velocity of light is constant, a distance resolution, when $\Delta t$ is set to be $1\mu s$, will be 150m which corresponds to $\Delta t/2$.

The output signals $P_1$ and $P_2$ respectively sampled by the sampling units 8 and 9 are operated at the adder 10 from which a difference valve $\Delta P$ between the signal outputs $P_1$ and $P_2$ is taken out. The voltage difference $\Delta P$ is free from any influence, as explained in connection with FIG. 2, brought about when the same laser pulse beams travel back and forth along the optical path $Z_0$-$Z_1$. Even if two laser pulse lights are transmitted, the same thing holds good unless there is involved a very rapid change in the state of materials present in the optical path. In any case, the value $\Delta P$ is a voltage produced as a result that any influence from the absorption and scattering of the laser beams by the contaminating materials present in the optical path $Z_0$-$Z_1$ (or at the time period $t_0-t_1$) is cancelled out. Stated more in detail, the light reception difference voltage $\Delta P$ represents absorption characteristics obtained from the Mie scattering beams from the materials present in the spacial distance between the positions $Z_1$ and $Z_2$ far off from the source of the transmitting light.

The output $\Delta P$ of the adder 10 is amplified by the DC amplifier 11 and the amplified output is supplied to the signal processing section 12 for analysis of air pollution or contamination. The signal processing section 12 processes each input signal so that the kind and concentration of the contaminating materials, i.e., gases or corpuscles, can be determined from the light reception difference voltage $\Delta P$ obtained with respect to a predetermined time period $t_1-t_2$, i.e., a predetermined position $Z_1-Z_2$, using each transmitting wavelength. At this signal processing section, the resonance absorption characteristic curve as shown in FIG. 3 is obtained.

To explain more in detail, suppose that there is transmitted a $4\mu m$-wavelength laser pulse light, obtained by adjusting, by a magnetic generator $2b$, a magnetic field intensity applied to a laser wavelength convertor 2, for example a Spin-Flip Raman laser (hereinafter referred to as an SFR laser) — this convertor 2 is cooled by a super low temperature generator $2a$ — to cause the wavelength of a laser light to be varied. If any gaseous $SO_2$ area exists in a certain area in the atmosphere 4, then the absorption of the $4\mu m$-wavelength laser pulse light by the gaseous $SO_2$ is increased with the result that the value $\Delta P$ is rapidly decreased. Now let it be assumed that a $4.2\mu m$-wavelength pulse laser light is transmitted likewise through adjustment of an applied magnetic field intensity by the magnetic generator $2b$ through magnetic field control $2c$. If any gaseous $CO_2$ area exists in the atmosphere, the absorption of the $4.2\mu m$-wavelength pulse laser light by the gaseous $CO_2$ is increased. As a result, the value $\Delta P$ is decreased. Thus, it is possible to determine the concentration of the contaminating gases present in the laser light transmitting optical path. It is therefore possible to determine the state of distribution of the contaminating materials present in a laser beam travelling direction. If a sampling period is time-sequentially shifted a time period $\Delta t$, in an abscissa direction in a coordinate system of FIG. 1, from the position $t_0$, then the state of distribution of the contaminating material is obtained. For each shift of the time period $\Delta t$ a single laser pulse light or two laser pulse lights may be transmitted. As a circuit for effecting such $\Delta t$ shift, use can be made of a sampling oscilloscope and the technique of a sampling pulse generating circuit used in effecting a band conversion.

Furthermore, a three-dimensional distribution of the contaminating materials can be determined by scanning the transmitting pulse in horizontal and vertical directions. The scanning of the transmitting pulse light can be effected by a mechanical means.

The detection data of the three-dimensional distribution of the contaminating materials may be one obtained by representing, or detecting in the form of DC voltage the three-dimensional state of the gases or corpuscles present in the spacial area corresponding to a difference between the spacial distances $Z_0-Z_1$ and $Z_0-Z_2$ (see FIG. 2) using a sampling oscilloscope (one kind of a sampling unit), strobing voltmeter etc. in place of a conventional real-time oscilloscope or real-time synchroscope.

The sampling oscilloscope is not adapted to display in real-time the intensity of a reception signal (FIG. 1÷Q) on a cathode ray tube, but designed to sample during a very short time period the intensity $f(t)$ of one, at a time $t$, of sequentially and regularly repeated reception signals and hold as DC voltage a light reception voltage corresponding to the interoity $f(t)$ until the next subsequent signal is reached. This DC voltage can be taken out either as a plus output or as a minus output. The waveform of this sampling oscilloscope is displayed on a cathode ray tube with a DC voltage $\Delta P$ from the adder 10 plotted as ordinate and with a wavelength of a transmitting laser light involved during a time $\Delta t$ plotted as abscissa. That is, this is a waveform representing a relation between the DC voltage $\Delta P$ and the wave form $\lambda$ of the transmitting laser light involved during the time period $\Delta t$, i.e., a difference between the first sampling time and the second sampling time. In this way, the contaminating materials present in the optical path length corresponding to a difference between the two sampling times can be shown, in the form of DC voltage, as shown in FIG. 3. As will be evident from FIG. 3, when a light of a certain wavelength is absorbed by a certain contaminating material, the value of the DC voltage $\Delta P$ is decreased. This indicates the distance for which the contaminating material is spaced from the source of the pulse light, as well as the kind and concentration of the contaminating material. In a case where the transmitting pulse light is in the form of a single pulse light, not as a repetitive pulse light, the reception signal Q as shown in FIG. 1 may be temporarily stored and later be sampled. In a case where a momentarily varying determination data is desired to be obtained or the storage of the data is difficult, a repetitive pulse light may be transmitted. The following is a practical example. A laser pulse light having a pulse width of $10^{-7}$ sec, a repetitive pulse frequency of $10^3$ Hz and an output of $10^4$ W was transmitted into the atmosphere, and Mie scattering beams were received. A light reception optical diameter was 60 cm and a light reception area was 2,800 $m^2$. With the distance $\Delta Z$ (FIG. 2) represented by 50 m, the intensity $P_2$ of the scattering beams from a position 200 m spaced apart from the source of the laser pulse light was $4.2 \times 10^{-8}$ mJ/sec. The intensity $P_1$ of the Mie scattering beams from a position 150 m spaced apart from the source of the laser pulse light was $7.05 \times \times 10^{-8}$ mJ/sec. The DC voltage $\Delta P$ was $2.75 \times 10^{-8}$ mJ/sec. When a pulse laser light of a wavelength $\lambda = 4.7 \mu m$, the wavelength, being in the neighborhood of a gaseous $CO_2$ absorption wavelength, was transmitted, then the level of the reception signal at $\Delta Z = 100$ m was 0.48 percent decreased.

As explained above, a coherent repetitive pulse is transmitted into the atmosphere, and signals (for example $P_1$, $P_2$ in FIG. 1) corresponding to two time positions defined by two sampling pulse generating times are extracted from the light reception signal. Then the kind and concentration of gases or corpuscles present in the spacial distance corresponding to a difference between the two time positions can be determined using the extracted signal. For example, the concentration of the gases or corpuscles can be determined from the ratio of $\Delta P$ involved when a certain gas is absent to $\Delta P$ involved when the gas is present. The concentration so obtained is of a relative value. The absolute value of the gas can be obtained by correcting the determined value using a test gas cell in which the absolute value of the corresponding gas is known.

The correction of the absolute value may also be made in the following manner. The wall of a building or a reflecting plate whose reflection coefficient is known is situated 500–1,000 m apart from the location in which a laser radar is installed. In connection with reflection signals obtained from the wall of the building or the reflecting plate, let the intensity of the reception signal having the wavelength $\lambda 1$ and that having the wavelength $\lambda 2$ be represented by $P(\lambda 1)$ and $P(\lambda 2)$ respectively. Then, the intensities $P(\lambda 1)$ and $P(\lambda 2)$ are expressed as follows:

$$P(\lambda 1) = \frac{PtCT\alpha K \exp[-2\{\alpha a(\lambda 1) + \alpha rs + \alpha s\}Z]}{2Z^2}$$

$$P(\lambda 2) = \frac{PtCT\alpha K \exp[-2\{\alpha a(\lambda 2) + \alpha rs + \alpha s\}Z]}{2Z^2}$$

If in this case $\lambda 1$ and $\lambda 2$ are closer in wavelength to each other, then scattering coefficients for the respective wavelengths $\lambda 1$ and $\lambda 2$ are considered to be substantially equal to each other. The wavelength $\lambda 1$ is taken to be in the center of absorption and the wavelength $\lambda 2$ is taken to be in a position free from absorption. Then the values $P(\lambda 1)$ and $P(\lambda 2)$ are connected into digitalized voltages using a known electrical method, and stored. The ratio of $P(\lambda 2)$ to $P(\lambda 1)$ is represented by the following equation (5).

$$\frac{P(\lambda 2)}{P(\lambda 1)} = \exp\left[2\{\alpha(\lambda 1) - \alpha(\lambda 2)\}\int_0^Z n(W)dw\right]$$
$$= \text{the ratio of voltages so obtained}$$
$$= W(Z \cdot \lambda 12) \quad (5)$$

From this, $$n(Z) = \frac{1}{2\{\alpha(\lambda 1) - \alpha(\lambda 2)\}W(Z \cdot \lambda 12)} \times \frac{d}{dZ}W(Z \cdot \lambda 12) \quad (6)$$

The concentration N of gases present in a spacial distance Z can be obtained from the equation (6). In this method the aforementioned gas cell for concentration correction has only to be provided. In this case, determination is made by passing the laser light through a gas whose concentration is known and then adjustment of various parameters in the equation is made, using the detection result, for determination of the absolute concentration of the gas in the atmosphere. Thus it is possible to determine the concentration of contaminating materials in the atmosphere.

In the equations (4'), (4''), (5) and (6);
$Pt$ = transmitted laser power
$c$ = light velocity
$T$ = gas temperature in centigrade
$\alpha$ = gas concentration to be detected
$K$ = constant
$\alpha a$ = term varied with respect to absorption
$\alpha rs$ = term varied with respect to resonance scattering
$\alpha s$ = term varied with respect to $\lambda$; and
$Z$ = distance from the source of a laser light source.

The SFR laser listed as the wavelength convertor 2 is set forth in "Applied Physics Letters" Vol. 19, No. 9, PP333–335, 1971, 11 and "Applied Physics" published by the Japanese Physical Society, Vol. 41, P38, 1972. To explain in brief, the SFR laser is one utilizing a phenomenon attributable to a Raman scattering through an incident light which causes inversion ($\Delta S=1$; S is a spin quantum number) of the spin state of conductive electrons in the Randau level of a semiconductor placed in a magnetic field. When the intensity of the incident light is increased to exceed a given threshold value an induced state is involved, resulting in a rapid increase in a scattering light. The directivity of the scattering light is also enhanced and a spectral band is narrowed. The induced Raman scattering is a non-linear optical phenomenon which requires no negative temperature state between the two levels as is found in a normal laser oscillation. If an energy gap between the two levels which induce a Raman transition is variable then the wavelengths of the induced Raman scattering beams are resonatable.

The oscillation frequency $\omega s$ of the SFR laser is generally expressed as follows (only a primary Stokes' line is represented):

$$\omega s = \omega p - g\mu\ B \cdot H$$

in which $\omega p$ denotes a pumping frequency; $g$ factor of the electron; and $\mu B$ a Bohr magnetron. As will be evident from this equation the oscillation frequency $\omega s$ of the Raman laser can be continuously varied by the intensity H of an exterior magnetic field applied to the semiconductor.

A material for the SFR laser is an n-type InSb. The crystal has a carrier concentration of $0.5-3\times10^{16}\text{cm}^{-3}$ and electron mobility of the order of $10^5\text{cm}^2\text{V}^{-1}\text{sec}^{-1}$ and is operated at a low temperature ranging from the temperature of liquid helium to 25°K. The threshold value of the induced Raman scattering is formed, upon detection, to be a lower value of $4 \times 10^4\text{W/cm}^2$. For the pumping of the SFR laser use may be made of a $CO_2$ laser having an output wavelength of $10.6\mu$ or a CO laser having an output wavelength of $5.3\mu$. The photon energy of the latter laser is fairly near to the forbidden band width of InSb and the Raman scattering cross section is increased by three-place due to the resonance effect. By using the CO gas laser for excitation of the SFR laser, a continuous oscillation of the SFR laser at a wavelength of $6\mu$ band can be attained. In this case, the oscillation efficiency reaches 50–80°. Use is usually made of a Q switch laser for the pumping of the SFR laser and, by utilizing a high output pulse of a high gas pressured transverse discharge type TEA (Transversely excited atmospheric) $CO_2$ gas laser for the purpose of the pumping of the SFR laser, an SFR laser oscillation having an output of 1KW and oscillation efficiency of 5 percent is obtained through oscillation of a primary Stokes' line. Also observed are an oscillation of a secondary Stokes' line and a primary anti-Stokes' line.

When a CO gas laser is used, it is difficult to excite the SFR laser with such a high output pulse as the TEA CO gas laser is used. The use of the CO gas laser for excitation of the SFR laser permits oscillation of secondary and tertiary Stokes' lines to be realized in the SFR laser by the aforementioned resonance effect. And a wider resonance range can be obtained. The spread of a continuously oscillated SFR laser beam is, in the case of a wavelength of 6$\mu$ band, of the order of 40 m rad.

As a semiconductor material for the SFR laser preferred is, in addition to said InSb, $Hg_{(1-x)}(dxTePb)_{(1-x)}SnxTe$ whose $g$ factor is greater and whose resonance scope is wider. In a case where there occurs an induced Raman scattering involving a transition between the two Randau levels whose quantum difference $\Delta l$ is 1 or 2, a range of resonatable wavelength out of 1 can be more and more widened in infrared area.

A resonatable coherent light can also be obtained by mixing the SFR laser output so obtained and a TEA $CO_2$ laser output having an output wavelength of 10.6$\mu$. In this case, use is made of Te as a crystal for the mixing purpose and of a $CO_2$ gas laser (wavelength of an oscillating pulse 10.6$\mu$; a peak output 300KW) for the pumping of the SFR laser. When the output light of the TEA $CO_2$ gas laser is incident in a direction orthogonal to a magnetic field applied to the SFR laser, then an SFR laser having an output of 1KW is obtained. Resonance was effected by varying said outer magnetic field intensity continuously from 30KG to 95KG. In this case, a resonance range of the SFR laser was $\lambda$ =11.2–12.8$\mu$. A light within this resonance range was mixed, within the crystal Te, with the laser output of the TEA $CO_2$ to produce a laser light having wavelengths of 5.47–5.49$\mu$. A peak output value from the crystal Te was about 3 W. The light incident angle into the crystal Te was controlled so that both the incident lights are phase matched.

In the embodiment shown in FIG. 4 use is made of the SFR laser as a wavelength converter 20, but this laser should not be restrictively taken in this invention. For example, a plurality of laser devices for oscillating laser lights having respective wavelengths necessary for detecting respective gases, and a suitable switching means, may be provided so that a laser pulse light having a wavelength necessary for determination can be transmitted through switching.

As a diode material for infrared semiconductor laser infrared region use may be made of a binary compound such as indium arsenide, indium-lead, lead telluride and so on. Use may also be made of materials including a pseudo binary alloy consisting principally of lead chalcogenide, such as PbSnTe and PbSSe, or a pseudo binary alloy such as HgCdTe, InGaAs and so on.

In the diode consisting principally of said lead chalcogenide laser oscillation, wavelength can be varied by changing an applied pressure thereto, its temperature and the ratio of the lead chalcogenide lead to the remaining material of the pseudo binary alloy (for example, the ratio of PbTe to Sn). Lead-salt lasers are susceptible to an influence from pressure as compared with a III–V Group GaAs semiconductor laser. Therefore, a very broader frequency resonation is possible by varying a unidirectional or hydraulic pressure applied to the diode. With the PbSe laser, for example, a resonation to an oscillation wavelength of 8–22$\mu$ could be obtained using liquid helium as a pressure transmitting liquid.

Though, with the above embodiment, the present apparatus is used for detecting the contaminating materials present in the atmosphere, it will be appreciated that the apparatus is also usable for detecting the kind and concentration of corpuscles. The apparatus can also be employed for detecting gases confined in a light transparent air-tight vessel or container.

What is claimed is:

1. An apparatus for detecting gases or corpuscles comprising: an oscillator for oscillating a laser pulse light; means for transmitting the laser pulse light into the atmosphere; means for varying the wavelength of the transmitting pulse light; a photoelectric convertor for receiving part of the transmitted laser light at the time of transmitting said laser pulse light to produce a first photoelectrically converted output; a phototelectric convertor for receiving scattering beams from the atmosphere to produce a second photoelectrically converted output; a delay circuit for delaying the first photoelectrically converted output to produce a first trigger pulse at a first time; a sampling position setting circuit for controlling the first time; a delay circuit for further delaying the first trigger pulse to produce a second trigger pulse at a second time; a distance resolution setter for controlling the second time; a sampling unit for deriving from the second photoelectrically converted output a first sampling output corresponding to the first time using the first trigger pulse supplied; a sampling unit for deriving from the photoelectrically converted output a second sampling output corresponding to the second time using the second trigger pulse supplied; and a device for taking out an output difference between the first sampling output and the second sampling output.

* * * * *